(12) United States Patent
Strength et al.

(10) Patent No.: US 6,175,783 B1
(45) Date of Patent: Jan. 16, 2001

(54) PAYLOAD CONTROL SYSTEM AND PAYLOAD CONTROLLER FOR OUTER SPACE VEHICLE PAYLOADS

(75) Inventors: Vernon Edward Strength, Long Beach; Richard R. Buser, Sunnyvale, both of CA (US)

(73) Assignee: McDonnell Douglass Corporation, Seal Beach, CA (US)

(*) Notice: Under 35 U.S.C. 154(b), the term of this patent shall be extended for 0 days.

(21) Appl. No.: 09/033,216

(22) Filed: Mar. 2, 1998

(51) Int. Cl.⁷ .............................. G06F 17/00; G05D 3/00
(52) U.S. Cl. ........................... 701/13; 701/3; 244/158 R; 244/164
(58) Field of Search .............................. 701/13, 3, 4, 14, 701/120, 121; 706/59, 45, 11; 702/108, 174; 244/158 R, 159, 164; 177/139, 141, 25.14

(56) References Cited

U.S. PATENT DOCUMENTS

| 4,446,524 | * | 5/1984 | Wendt | 701/124 |
| 5,152,482 | * | 10/1992 | Perkins et al. | 244/158 R |
| 5,271,582 | * | 12/1993 | Perkins et al. | 244/158 R |
| 5,390,081 | | 2/1995 | St. Pierre . | |
| 5,623,411 | | 4/1997 | Morvan . | |
| 5,802,255 | * | 9/1998 | Hughes et al. | 706/59 |
| 5,808,921 | * | 9/1998 | Gold et al. | 702/108 |
| 5,839,696 | * | 11/1998 | Caplin et al. | 244/159 |
| 6,000,661 | * | 12/1999 | Price et al. | 244/164 |

* cited by examiner

Primary Examiner—Jacques H. Louis-Jacques
(74) Attorney, Agent, or Firm—Brooks & Kushman P.C.

(57) ABSTRACT

A payload control system and payload controller for a payload onboard an outer space vehicle having a host computer system are provided. The payload controller includes a unitary compact control unit mounted on a circuit board. The control unit includes a processor, memory, display device control logic, input device control logic, and data input/output control logic. A plurality of interfaces located about the board surfaces provide communication with payload and host system components. A computer readable storage medium mounted on the circuit board stores information to control the payload when the payload is in outer space. The information stored in the computer readable storage medium is non-permanent so that the payload controller may be re-used for different payload experiments. The unitary compact control unit includes sufficient components to function as a stand alone computer capable of running an operating system while supporting a display device and an input device. The computer readable storage medium may be programmed on Earth for subsequent use of the payload controller in space.

8 Claims, 3 Drawing Sheets

PAYLOAD CONTROL SYSTEM AND PAYLOAD CONTROLLER FOR OUTER SPACE VEHICLE PAYLOADS

TECHNICAL FIELD

The present invention relates to payload control systems and payload controllers for outer space vehicle payloads.

BACKGROUND ART

The International Space Station (ISS), when complete, and other space platforms have payload facilities supported by a host computer system, such as an on-board data communications network with provisions for mass data storage, crew monitoring and interaction, and ground uplink/downlink. In such payload facilities, a large number of payloads will operate simultaneously. The internal functions of each payload are regulated by a payload controller.

Typically, a payload controller includes a plurality of function cards connected as a stack system using PC-104 connectors. The existing stack system payload controllers are specifically configured for each application. Because the stack system controllers are application specific, a new payload controller must be constructed for each payload.

SUMMARY OF THE INVENTION

It is, therefore, an object of the present invention to provide a programmable payload controller in which local payload functions are stored in a local medium to reduce space platform network traffic, and to allow re-use of the controller for different payload experiments.

It is another object of the present invention to provide a payload control system including a programmable payload controller for a payload on board and outer space vehicle.

In carrying out the above objects and other objects and features of the present invention, a payload controller for use in a payload on board an outer space vehicle is provided. The outer space vehicle has a host computer system. The payload include sensors which generate output signals indicative of payload operating conditions, and control devices which receive input signals to control the payload when the payload is in outer space. The payload controller comprises a unitary compact control unit mounted on a circuit board. The control unit includes a processor, memory, display device control logic, input device control logic, and data input/output control logic. A display device interface is connected to the display device control logic. An input device interface is connected to the input device control logic. A host system interface is connected to the data input/output control logic for communicating with the host computer system. A plurality of output drivers are connected to the data input/output control logic for sending the input signals to the payload control devices. A plurality of input drivers are connected to the data input/output control logic for receiving the output signals from the payload sensors. A payload interface is connected to the data input/output control logic for communicating with the payload.

A computer readable storage medium is mounted on the circuit board for storing information. The information represents instructions executable by the processor to communicate with the host computer system, the payload control devices, the payload sensors, and the payload to control the payload when the payload is in outer space. The information stored in the computer readable storage medium is non-permanent so that the payload controller may be re-used for different payload experiments. The unitary compact control unit includes sufficient components to function as a stand alone computer capable of running an operating system while supporting a display device attached to the display device interface and an input device attached to the input device interface. The computer readable storage medium may be programmed on Earth for subsequent use of the payload controller in space, by using the unitary compact control unit as a stand alone computer.

In a preferred embodiment, the host system interface further comprises local area network driver circuitry substantially formed as a single integrated circuit mounted on the circuit board. Further, the data input/output control logic includes hard disk drive control logic; and, the payload controller includes a hard disk drive interface connected to the hard disk drive control logic. Still further, the data input/output control logic includes floppy disk drive control logic; and, the payload controller includes a floppy disk drive interface connected to the floppy disk drive control logic.

Further, in carrying out the present invention, a payload control system including a payload controller for a payload on board an outer space vehicle having a host computer system is provided. The payload control system includes a payload controller of the present invention. The payload control system further comprises a display device, an input device, and a disk drive for connecting to the display device interface, input device interface, and disk drive interface, respectively, when the payload controller is on Earth. The unitary compact control unit includes sufficient components to function as a stand alone computer capable of running an operating system while supporting the display device, the input device, and the disk drive, such that the computer readable storage medium may be programmed on Earth for subsequent use of the payload controller in space.

The advantages accruing to the present invention are numerous. For example, embodiments of the present invention provide a payload controller which reduces network traffic on the space platform host computer system primarily to experiment data handling and command software updates. Further, embodiments of the present invention make minimal demands on space platform resources such as power, volume, mass, and crew time.

While embodiments of this invention have been illustrated and disclosed, these embodiments should not be construed to limit the claims. It is anticipated that various modifications and alternative designs may be made without departing from the scope of this invention.

BEST MODE FOR CARRYING OUT THE INVENTION

Figure 1:
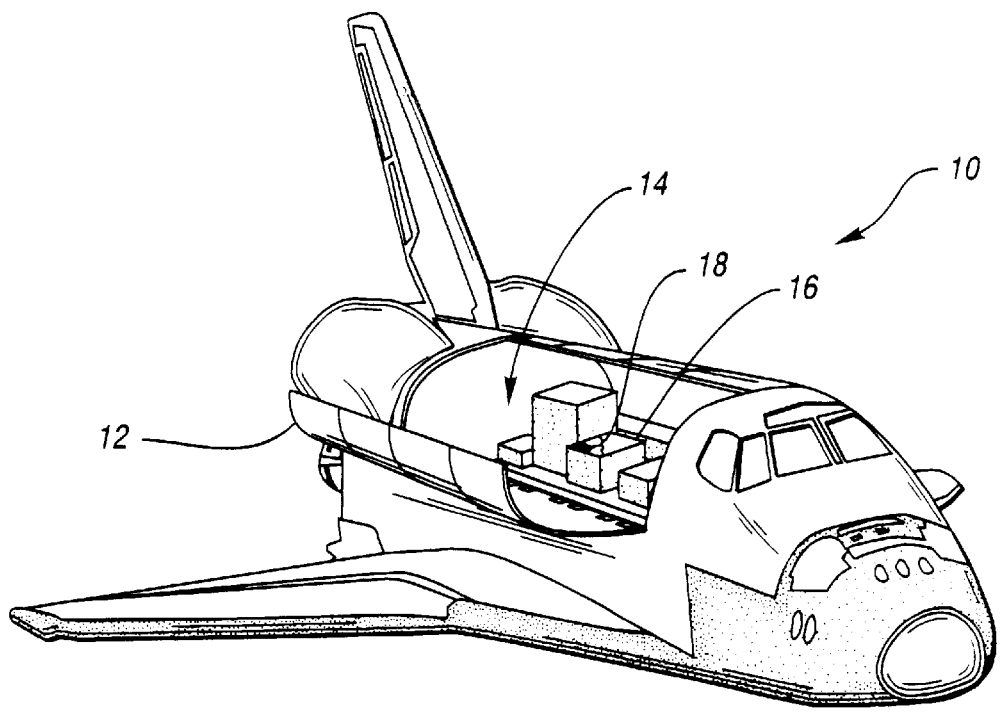
FIG. 1 is a space shuttle with one of the cargo area doors opened, showing payloads in the cargo area.

With reference to FIG. 1, a space shuttle is generally indicated at 10. The space shuttle 10 is shown with cargo area door 12 opened. The cargo area is generally indicated at 14. The cargo area 14 contains a plurality of payloads 16. The payloads 16 may each be controlled with a single board payload controller 18, made in accordance with the present invention.

Figure 2:
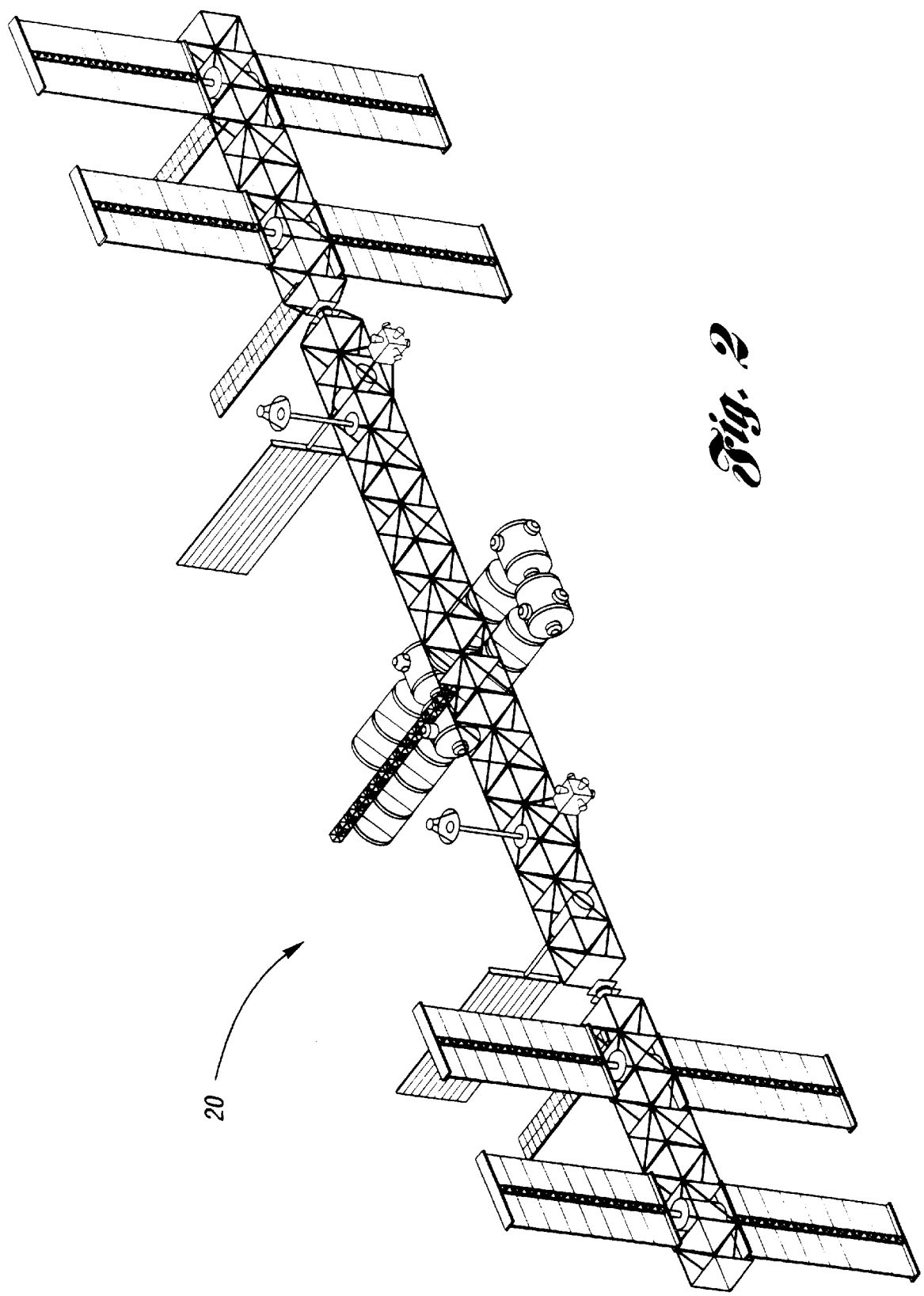
FIG. 2 is a space station at which payload controllers of the present invention may communicate with the space station host computer system.

With reference to FIG. 2, a space station is generally indicated at 20. It is to be appreciated that other space vehicles or platforms may be suitable for payload operation, and thus suitable for use of the single board controller 18. Further, the use of the term outer space vehicle herein means any space vehicle including but not limited to a space shuttle, a space station, or any other suitable space platform or vehicle capable of supporting a payload.

Figure 3:
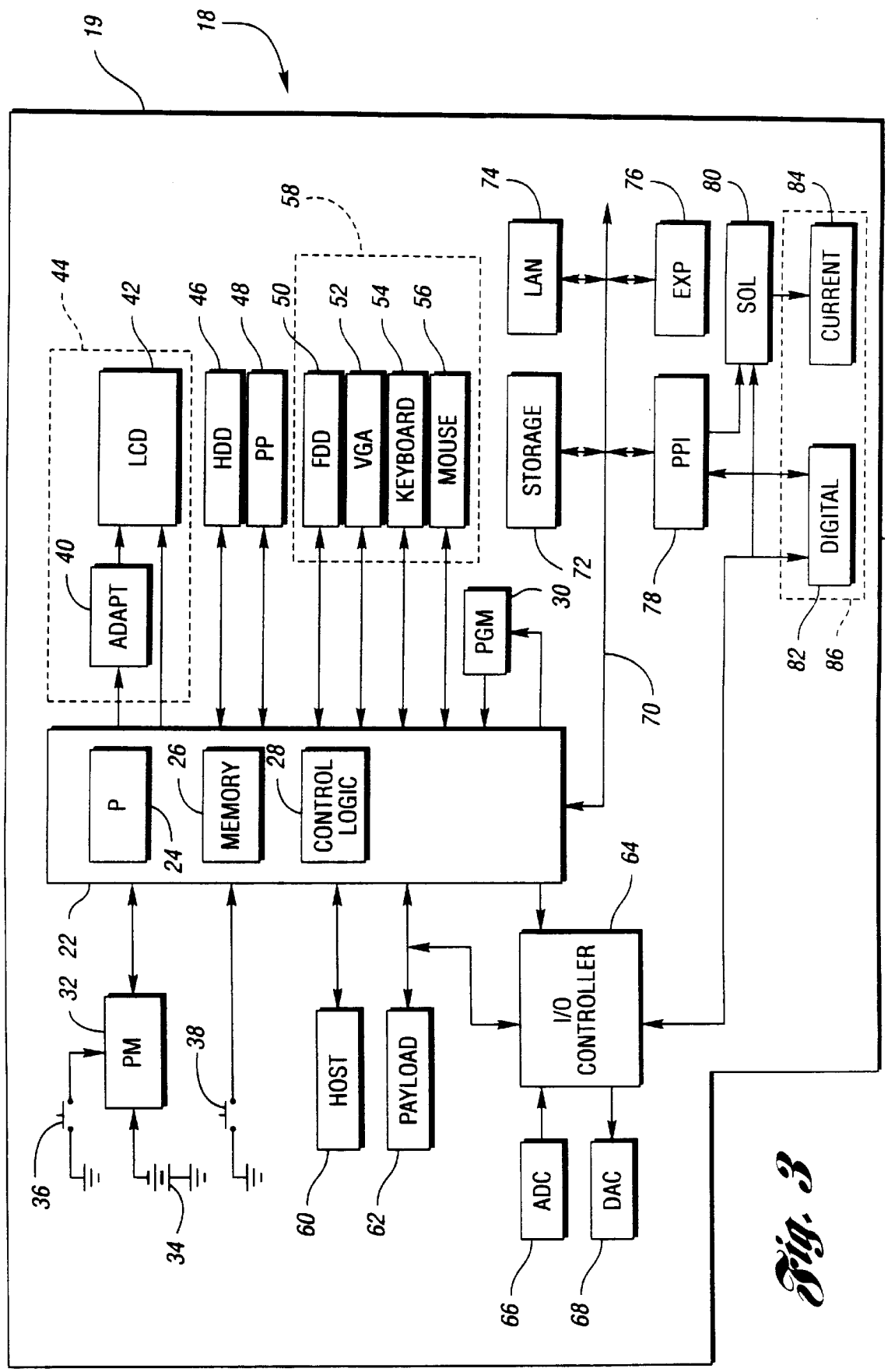
FIG. 3 is a block diagram illustrating a payload controller of the present invention.

With reference to FIG. 3, the single board payload controller 18 of the present invention includes a circuit board 19. A unitary compact control unit 22 is mounted on the circuit board 19. The control unit 22 includes a processor 24, memory 26, and control logic 28. The processor 24 preferably includes a motherboard chip set substantially formed as a single integrated circuit. The control logic 28 includes display device control logic, input device control logic, and data input/output control logic. The input device control logic preferably includes keyboard control logic and mouse control logic. The data input/output control logic preferably includes floppy disk drive control logic and hard disk drive control logic. Control unit 22 is preferably mounted on spacer washers positioned between control unit 22 and circuit board 19 such that other components may be located between control unit 22 and circuit board 19. Preferably, control unit 28 is the CARDIO, available from S-MOS Systems, Inc.

Programming logic 30 provides stepped-up voltage for programmable memory 26 which may be EEPROM or any other known suitable memory device. Power management logic 32, optional battery 34, reset push-button 36, and resume push-button 38 perform power management functions for control unit 22. Power management logic 32 cooperates with control unit 22 to reset control unit 22, to perform power management, and to act as a watchdog timer. Push-button 36 may be pressed at any time to reset control unit 22. After a reset operation, push-button 38 must be pushed to cause control unit 22 to resume operation.

Further, in a preferred embodiment, the display device control logic includes both liquid crystal display (LCD) control logic and video graphics array (VGA) control logic. Control logic 28 may be implemented in a variety of ways as would be apparent to one of ordinary skill in the art, including software and hardware. Output pins of control unit 22 preferably connect to the board circuitry via an EASI bus. A plurality of interfaces are preferably located about the circuit board outer edges. The interfaces are connected to the control unit pins via the board circuitry. An LCD voltage adaptor 40 and LCD interface 42 form LCD interface 44. Further, a hard disk drive interface 46 and a parallel port 48 connect to appropriate control logic 28 and are preferably located at edges of circuit board 19. Floppy disk drive interface 50, video graphics array interface 52, keyboard interface 54, and mouse interface 56 preferably all route to a single system interface 58.

A host system interface 60, preferably RS-422 or RS-232, is connected to the data input/output control logic for communicating with the host computer system which is located on space station 20 or any other suitable space platform. A payload interface 62, preferably RS-485, is connected to the data input/output control logic for communicating with the payload. An input/output controller 64 is mounted on circuit board 19, or alternatively may be integrated with control unit 22. Preferably, controller 64 is the ANSWER MAN, available from Micromint, Inc. A plurality of input drivers include analog digital converter inputs 66 connected to data input/output control logic via input/output controller 64. A plurality of output drivers including digital to analog converter outputs 68 are connected to the data input/output control logic by input/output controller 64.

A data bus 70, preferably ISA, is also in communication with control 22. A computer readable storage medium 72 is mounted on the circuit board for storing information. The information represents instructions executable by the processor 24 to communicate with the host computer system, the payload control device, and the payload sensors. The single board controller 18 controls the payload when the payload is in outer space; and, the information stored in the computer readable storage medium 72 is non-permanent so that the payload controller may be re-used for different payload experiments. The unitary compact control unit 22 includes sufficient components to function as a stand alone computer capable of running an operating system while supporting a display device, an input device, and optionally a disk drive. Preferably, storage medium 72 is the DISK-ON-CHIP, available from M-Systems, Inc.

Further, in a preferred embodiment, local area network circuitry 74 (LAN) is in communication with data bus 70, and is preferably substantially formed of a single integrated circuit. Preferably, LAN circuitry 74 is the PC-NET, available from Advanced Micro Devices, Inc. Still further, a PC-104 expansion port 76 is located at an outer edge of the circuit board 19 for communicating with any other payload controllers, as desired.

A programmable peripheral interface 78 is also in communication with data bus 70. The programmable peripheral interface 78 controls solenoid drivers 80 which connect to current driver output interface 84. Programmable peripheral interface 78 also drives a plurality of digital input/output bits. The digital input/output bits are located at digital input/output interface 82. The digital input/output bits may also be supplied solely or partially by input/output controller 64.

Figure 4:
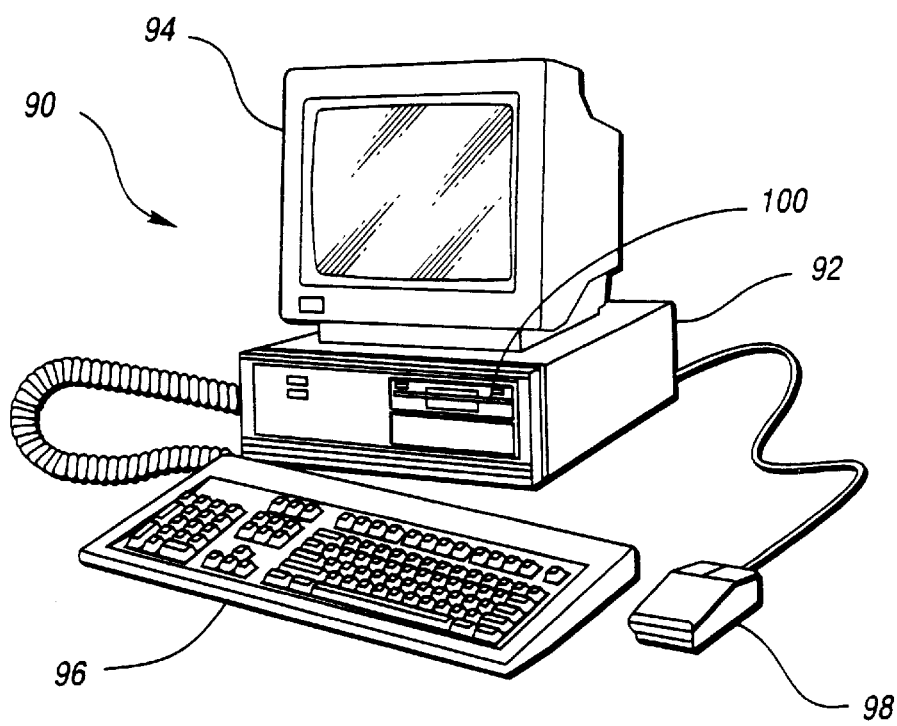
FIG. 4 is a payload control system having a central processing unit including a payload controller of the present invention, for use on Earth to program the payload controller before using the payload controller in outer space.

As best shown in FIG. 4, a computer system is generally indicated at 90. Computer system 90 includes central processing unit 92. For central processing unit 92 to operate, only the single board controller 18 need be located therein. Single board controller 18 may be simply placed within housing 92, and direct cable connections may be made from the interfaces about the outer edge of the single board controller 18 to display device 94, keyboard 96, mouse 98, and floppy disk drive 100. Preferably, a hard disk drive is also located within central processing unit 92. The hard disk drive may be directly connected by a cable to the hard disk drive interface of the single board controller 18. Further, single board controller 18 may be configured to support a CD ROM drive or any other devices, as desired.

In accordance with the present invention, software required for local payload functions may be resonant in computer readable storage medium 72, reducing network traffic primarily to experiment data handling and command software updates. The single board controller 18 of the present invention makes reduced demands on space station and platform resources such as power, volume, mass, and crew time.

In a preferred embodiment, the single board controller incorporates commercial off the shelf parts to avoid the large nonrecurring costs of designs customized for specific applications. To ensure reliability in design with commercial components, the single board controller has been ruggedized to withstand launch and space environments. Watchdog timers and error detection and correction software provide reliable operation under space radiation conditions. The electric components have been selected to operate in the environment ranges of space station internal and external payloads. Sufficient memory is provided to accommodate familiar operating systems and high-level applications. In a preferred embodiment the single board controller measures only about 11.0x, 13.4 centimeters, and draws only 4.65 watts. The preferred embodiment of the single board controller is as powerful and as easy to use as a personal computer.

It is to be appreciated that cyclotron testing of the single board controller using a proton beam showed that the single board controller operates effectively in anticipated environments, including those of pressurized and unpressurized payloads. That is, testing has shown that radiation is unlikely to significantly effect payload functions.

Further, a complete payload control system may include connectors for connecting the single board controller to other components for use as a stand alone computer. Still further, familiar operating systems such as DOS, WINDOWS, and LINUX may be supported by the single board controller.

Still further, it is to be appreciated that the circuit board of the single board controller preferably employs high density routing, multilayer construction, and two-sided surface mounting technologies to provide interconnection and structural support for the board components.

While embodiments of this invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A payload control system including a payload controller for a payload on board an outer space vehicle having a host computer system, the payload including sensors which generate output signals indicative of payload operating conditions, and control devices which receive input signals to control the payload when the payload is in outer space, the payload controller including a circuit board, and the payload control system further comprising:
   a unitary compact control unit mounted on the circuit board, the control unit including a processor, memory, display device control logic, input device control logic, disk drive control logic, and data input/output control logic;
   a display device interface on the circuit board and connected to the display device control logic;
   an input device interface on the circuit board and connected to the input device control logic;
   a disk drive interface on the circuit board and connected to the disk drive control logic;
   a host system interface on the circuit board and connected to the data input/output control logic for communicating with the host computer system;
   a plurality of output drivers on the circuit board and connected to the data input/output control logic for sending the input signals to the payload control devices;
   a plurality of input drivers on the circuit board and connected to the data input/output control logic for receiving the output signals from the payload sensors;
   a payload interface on the circuit board and connected to the data input/output control logic for communicating with the payload;
   a display device for connecting to the display device interface when the payload controller is on Earth;
   an input device for connecting to the input device interface when the payload controller is on Earth;
   a disk drive for connecting to the disk drive interface when the payload controller is on Earth; and
   a computer readable storage medium mounted on the circuit board for storing information representing instructions executable by the processor to communicate with the host computer system, the payload control devices, the payload sensors, and the payload, so as to control the payload when the payload is in outer space, wherein the information stored in the computer readable storage medium is non-permanent so that the payload controller may be re-used for different payload experiments, and
   wherein the unitary compact control unit includes sufficient components to function as a stand alone computer capable of running an operating system while supporting the display device, the input device, and the disk drive, such that the computer readable storage medium may be programmed on Earth for subsequent use of the payload controller in space.

2. The payload control system of claim 1 wherein the host system interface further comprises:
   local area network driver circuitry substantially formed as a single integrated circuit mounted on the circuit board.

3. A payload controller for use in a payload on board an outer space vehicle having a host computer system, the payload including sensors which generate output signals indicative of payload operating conditions, and control devices which receive input signals to control the payload when the payload is in outer space, the payload controller comprising:
   a circuit board;
   a unitary compact control unit mounted on the circuit board, the control unit including a processor, memory, display device control logic, input device control logic, and data input/output control logic;
   a display device interface connected to the display device control logic;
   an input device interface connected to the input device control logic;
   a host system interface connected to the data input/output control logic for communicating with the host computer system;
   a plurality of output drivers connected to the data input/output control logic for sending the input signals to the payload control devices;
   a plurality of input drivers connected to the data input/output control logic for receiving the output signals from the payload sensors;
   a payload interface on the circuit board and connected to the data input/output control logic for communicating with the payload, the payload interface including a serial interface; and
   a computer readable storage medium mounted on the circuit board for storing information representing instructions executable by the processor to communicate with the host computer system, the payload control devices, the payload sensors, and the payload, so as to control the payload when the payload is in outer space, wherein the information stored in the computer readable storage medium is non-permanent so that the payload controller may be re-used for different payload experiments, and wherein the unitary compact control unit includes sufficient components to function as a stand alone computer capable of running an operating system while supporting a display device attached to the display device interface and an input device attached to the input device interface, such that the computer readable storage medium may be programmed on Earth for subsequent use of the payload controller in space.

4. The payload controller of claim 3 wherein the host system interface further comprises:

local area network driver circuitry substantially formed as a single integrated circuit mounted on the circuit board.

5. The payload controller of claim 3 wherein the data input/output control logic includes hard disk drive control logic, and wherein the payload controller further comprises:

a hard disk drive interface connected to the hard disk drive control logic.

6. The payload controller of claim 3 wherein the data input/output control logic includes floppy disk drive control logic, and wherein the payload controller further comprises:

a floppy disk drive interface connected to the floppy disk drive control logic.

7. A payload controller for use in a payload on board an outer space vehicle having a host computer system, the payload including sensors which generate output signals indicative of payload operating conditions, and control devices which receive input signals to control the payload when the payload is in outer space, the payload controller comprising:

a circuit board;

a unitary compact control unit mounted on the circuit board, the control unit including a processor, memory, display device control logic, keyboard control logic, mouse control logic, data input/output control logic, floppy disk drive control logic, and hard disk drive control logic;

a display device interface connected to the display device control logic;

a keyboard interface connected to the keyboard control logic;

a mouse interface connected to the mouse control logic;

a floppy disk drive interface connected to the floppy disk drive control logic;

a hard disk drive interface connected to the hard disk drive control logic;

a host system interface connected to the data input/output control logic for communicating with the host computer system;

a plurality of output drivers connected to the data input/output control logic for sending the input signals to the payload control devices;

a plurality of input drivers connected to the data input/output control logic for receiving the output signals from the payload sensors;

a payload interface on the circuit board and connected to the data input/output control logic for communicating with the payload; and a computer readable storage medium mounted on the circuit board for storing information representing instructions executable by the processor to communicate with the host computer system, the payload control devices, the payload sensors, and the payload, so as to control the payload when the payload is in outer space, wherein the information stored in the computer readable storage medium is non-permanent so that the payload controller may be re-used for different payload experiments, and wherein the unitary compact control unit includes sufficient components to function as a stand alone computer capable of running an operating system while supporting a display device, a keyboard, a mouse, a floppy disk drive, and a hard disk drive attached to the respective interfaces such that the computer readable storage medium may be programmed on Earth for subsequent use of the payload controller in space.

8. A payload controller for use in a payload on board an outer space vehicle having a host computer system, the payload including sensors which generate output signals indicative of payload operating conditions, and control devices which receive input signals to control the payload when the payload is in outer space, the payload controller comprising:

a circuit board;

a unitary compact control unit mounted on the circuit board, the control unit including a processor including a motherboard chip set substantially formed as a single integrated circuit, the control unit further including memory, display device control logic, keyboard control logic, mouse control logic, data input/output control logic, floppy disk drive control logic, and hard disk drive control logic;

spacer washers positioned between the unitary compact control unit and the circuit board such that other components may be located between the control unit and the circuit board;

a display device interface connected to the display device control logic;

a keyboard interface connected to the keyboard control logic;

a mouse interface connected to the mouse control logic;

a floppy disk drive interface connected to the floppy disk drive control logic;

a hard disk drive interface connected to the hard disk drive control logic;

a host system interface connected to the data input/output control logic for communicating with the host computer system;

an expansion interface connected to the data input/output control logic for connecting the payload controller to an expansion slot on a different payload controller;

local area network driver circuitry substantially formed as a single integrated circuit mounted on the circuit board;

a plurality of digital input/output drivers connected to the data input/output control logic for sending the input signals to the payload control devices, and for receiving the output signals from the payload sensors;

a plurality analog to digital convertor inputs connected to the data input/output control logic for receiving the output signals from the payload sensors;

a plurality of digital to analog convertor outputs connected to the data input/output control logic for sending the input signals to the payload control devices;

a payload interface connected to the data input/output control logic for communicating with the payload; and a computer readable storage medium mounted on the circuit board for storing information representing instructions executable by the processor to communicate with the host computer system, the payload control devices, the payload sensors, and the payload so as to control the payload when the payload is in outer space, wherein the information stored in the computer readable storage medium is non-permanent so that the payload controller may be re-used for different payload experiments, and wherein the unitary compact control unit includes sufficient components to function as a stand alone computer capable of running an operating system while supporting a display device, a keyboard, a mouse, a floppy disk drive, and a hard disk drive attached to the respective interfaces such that the computer readable storage medium may be programmed on Earth for subsequent use of the payload controller in space.

* * * * *